April 29, 1952 F. FREIMANN ET AL 2,594,633
RECORD CHANGER
Filed Nov. 29, 1945 9 Sheets-Sheet 1
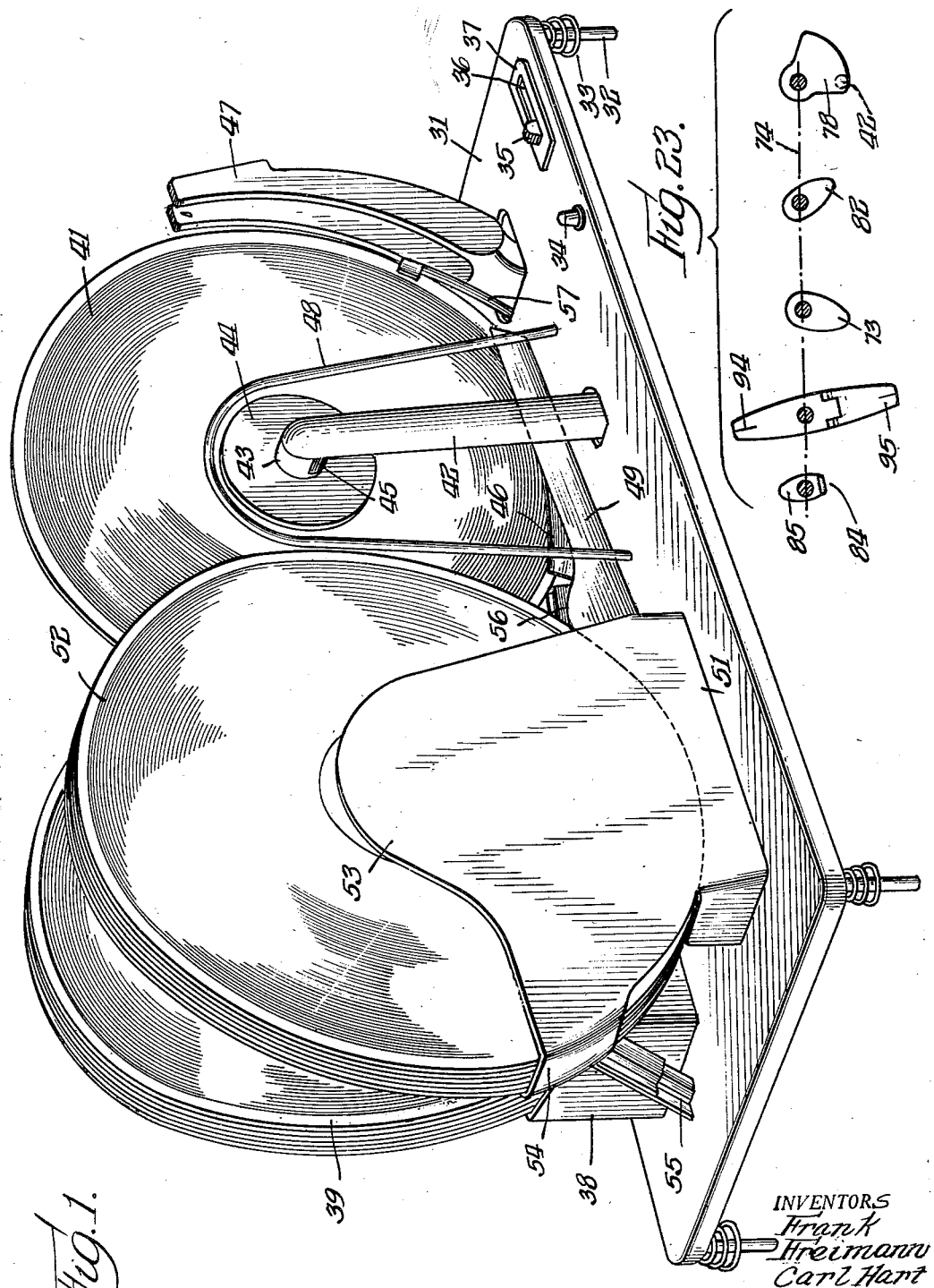

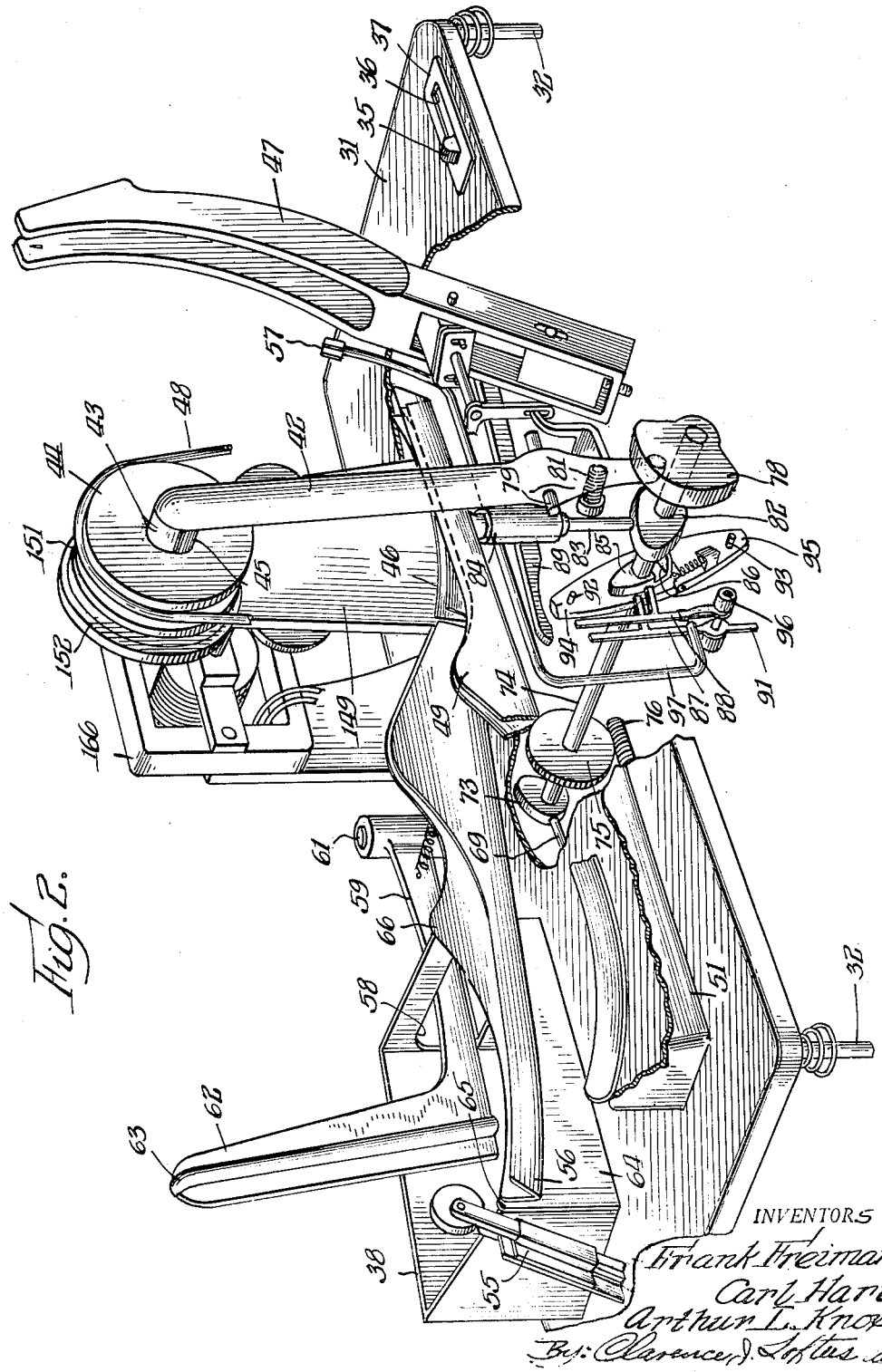

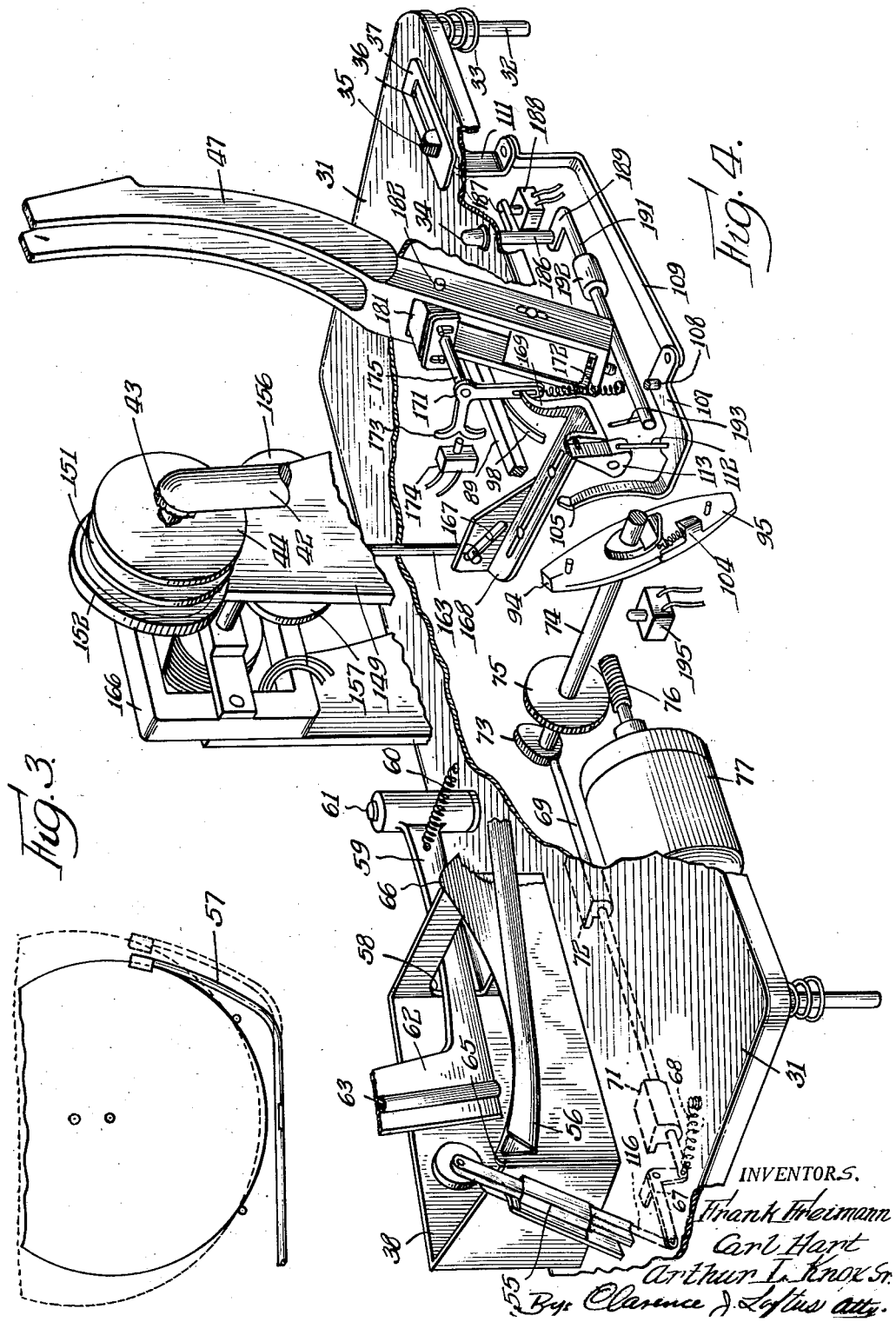

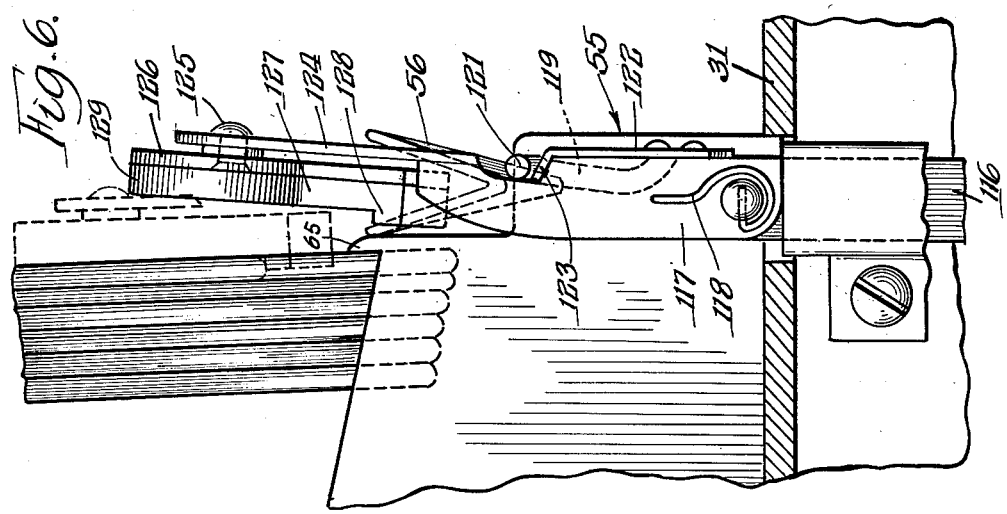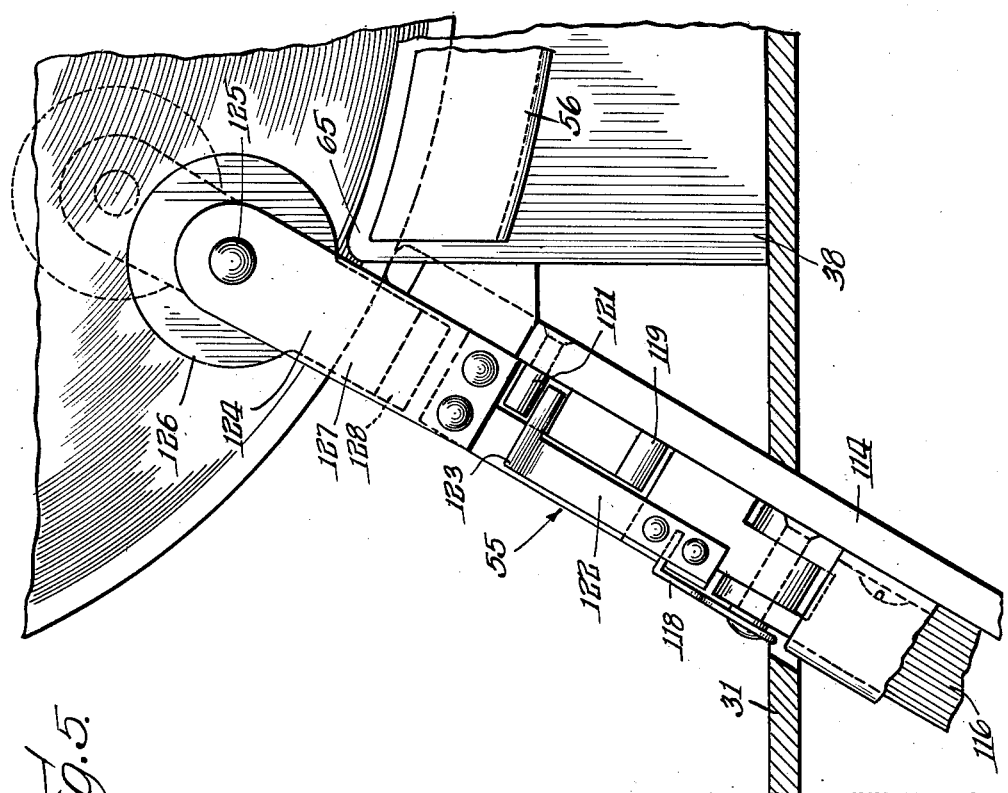

April 29, 1952    F. FREIMANN ET AL    2,594,633
RECORD CHANGER
Filed Nov. 29, 1945    9 Sheets-Sheet 5
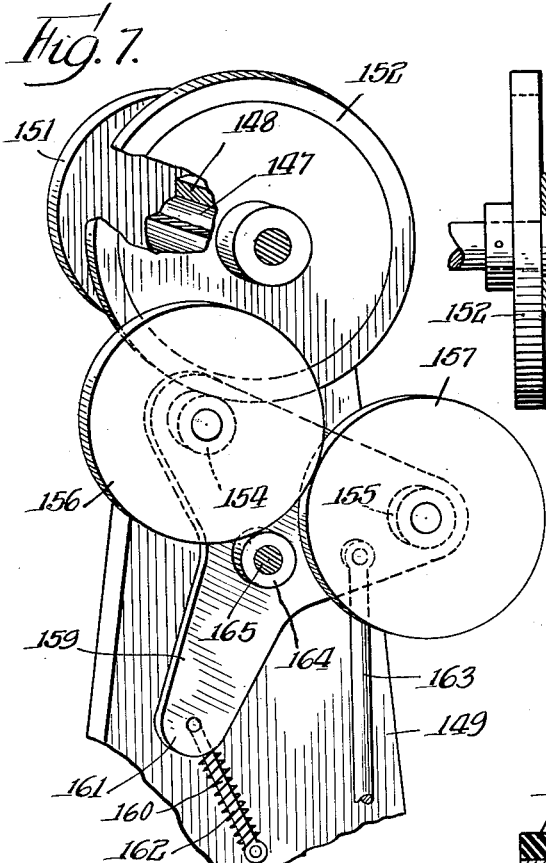
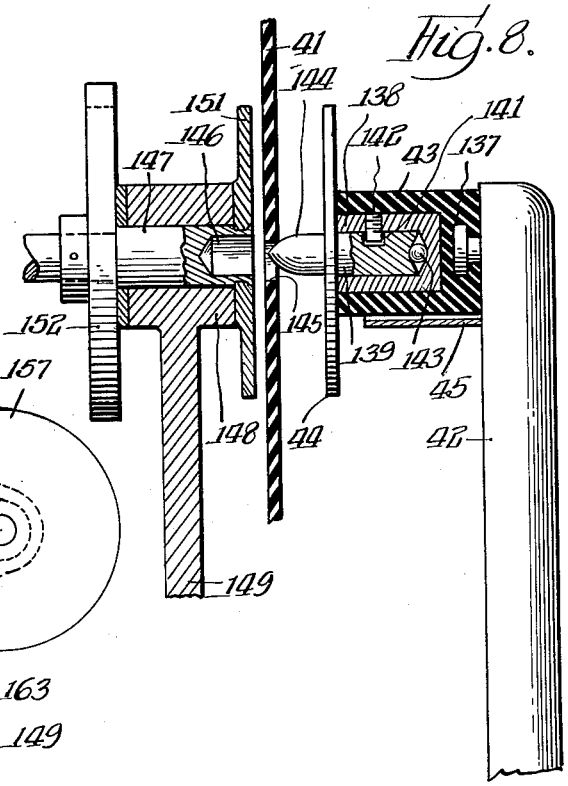
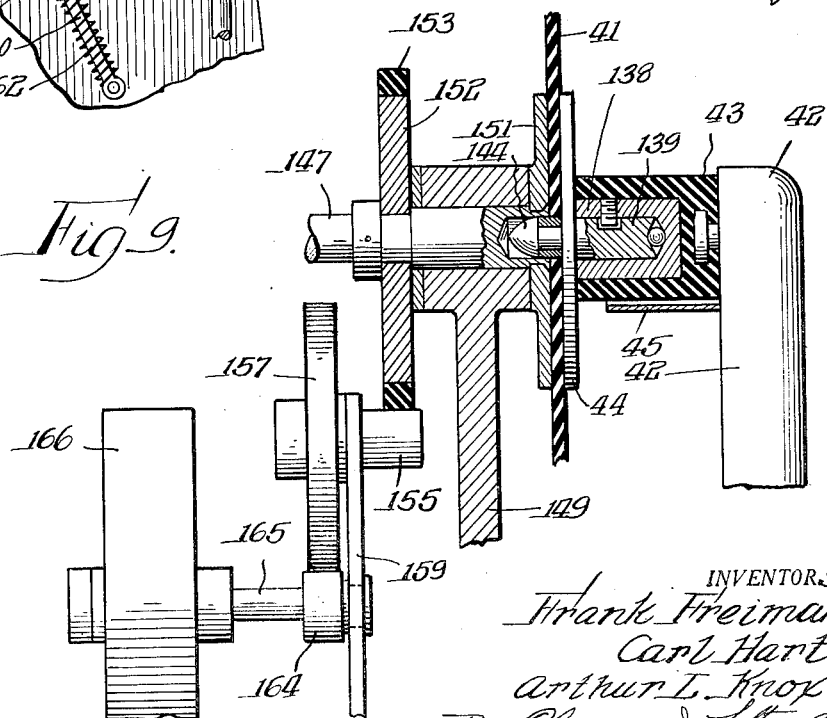
INVENTORS
Frank Freimann
Carl Hart
Arthur L. Knox Sr.
By Clarence J. Loftus Atty.

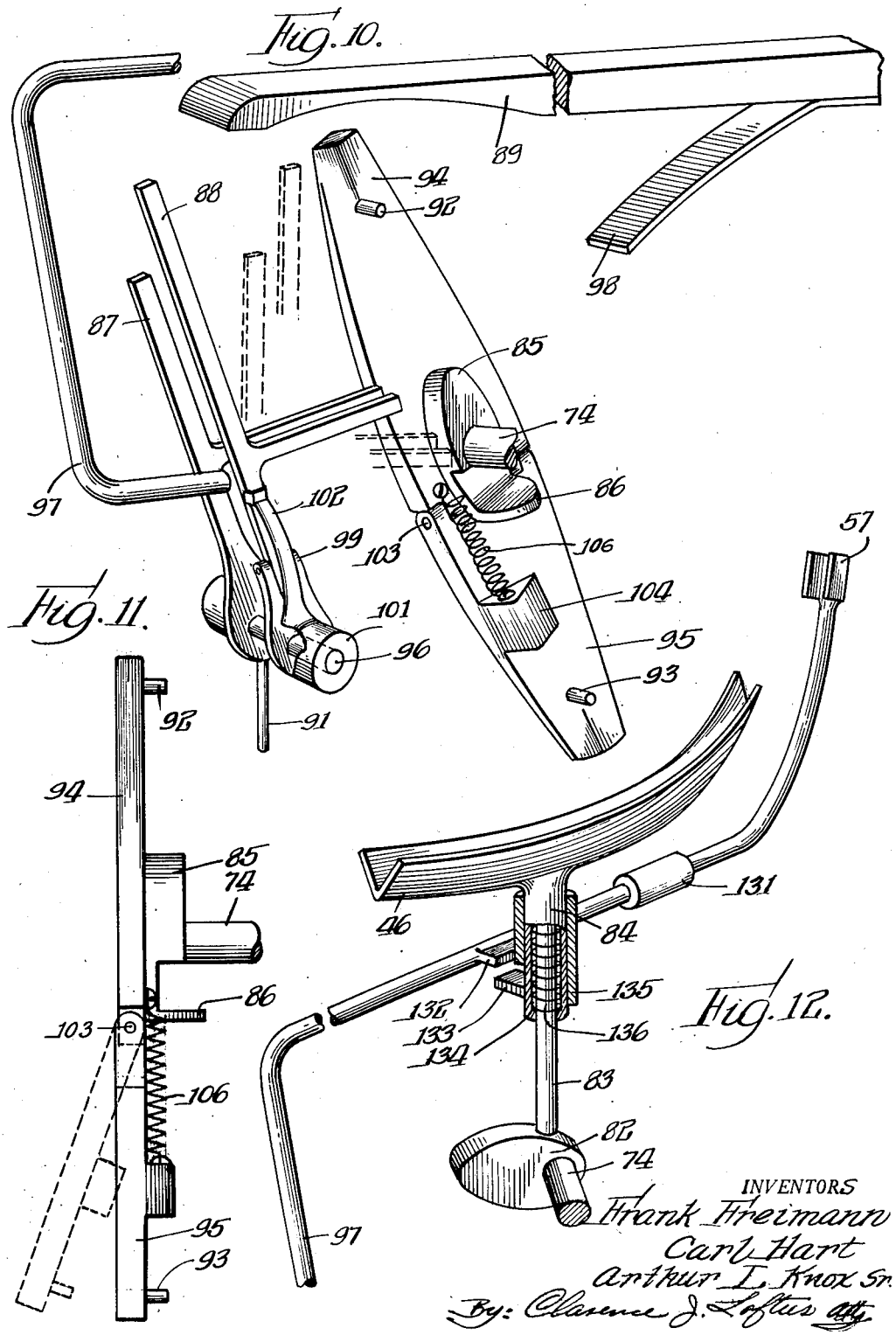

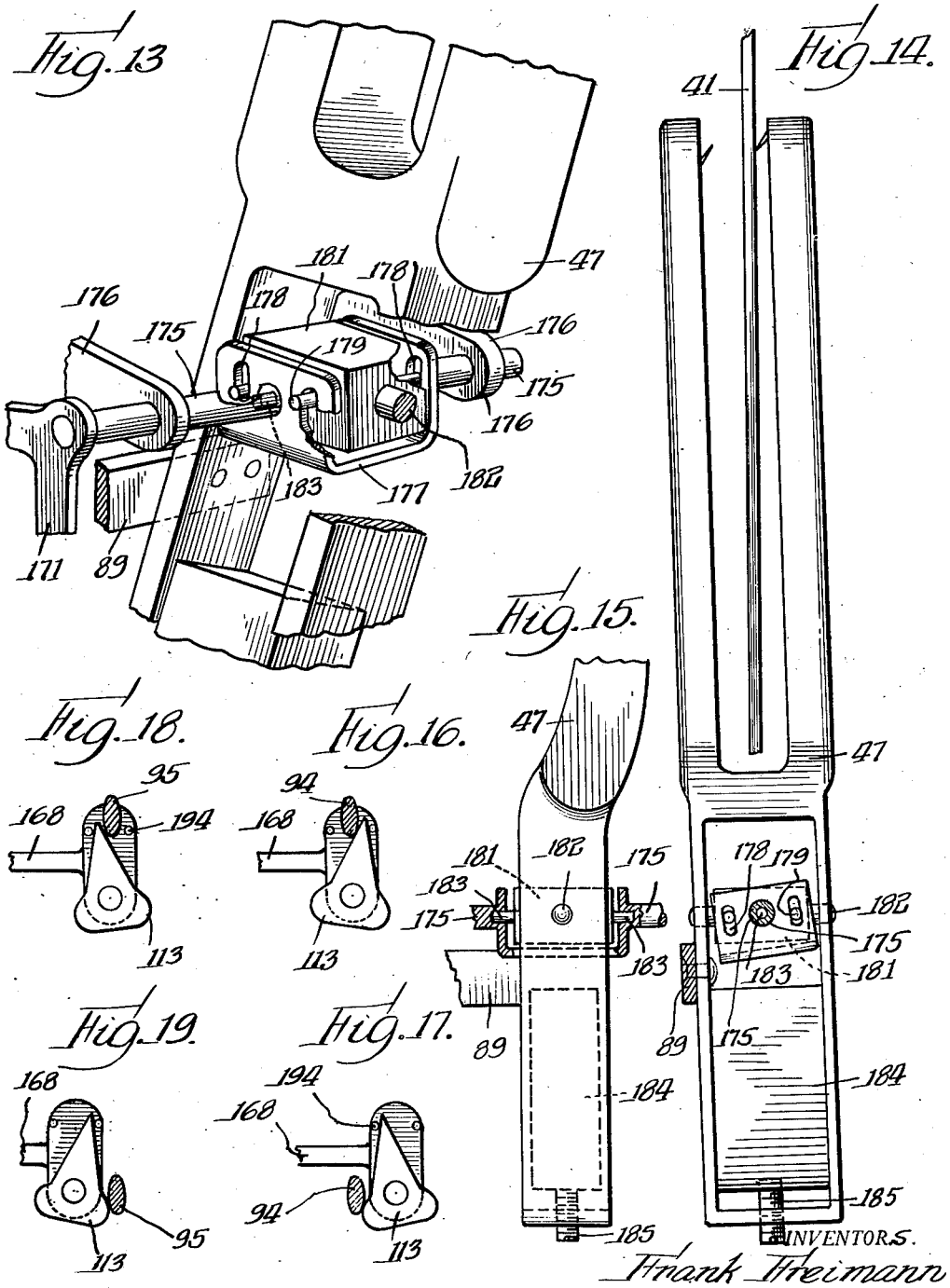

April 29, 1952   F. FREIMANN ET AL   2,594,633
RECORD CHANGER
Filed Nov. 29, 1945   9 Sheets-Sheet 8
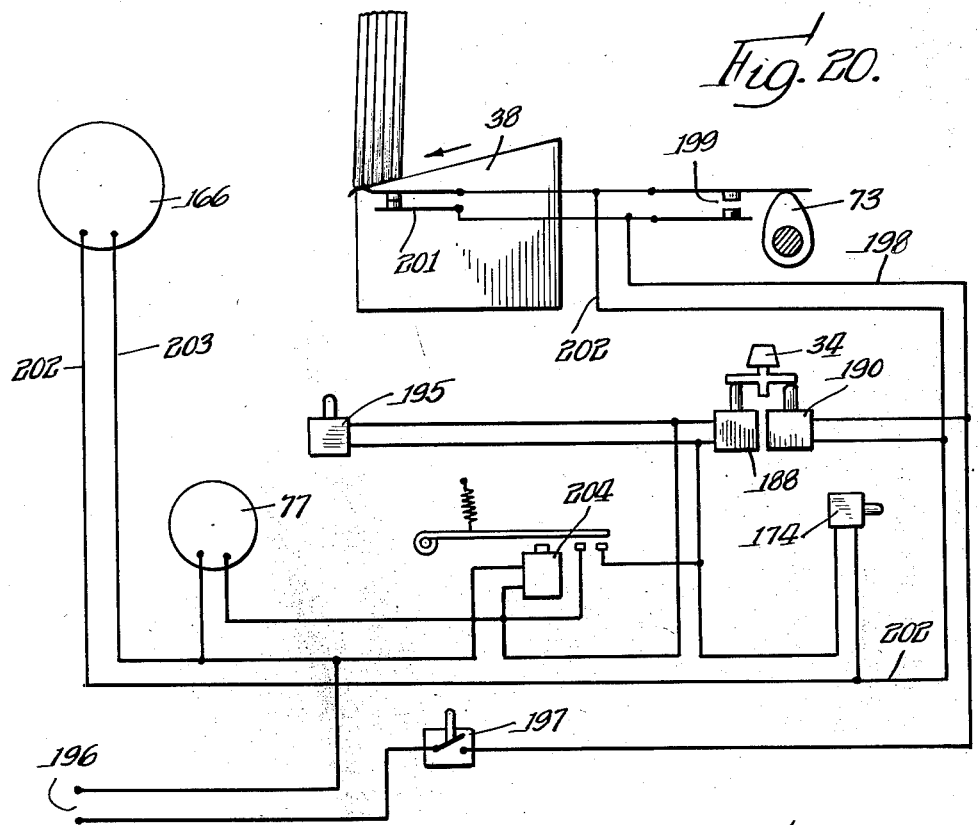
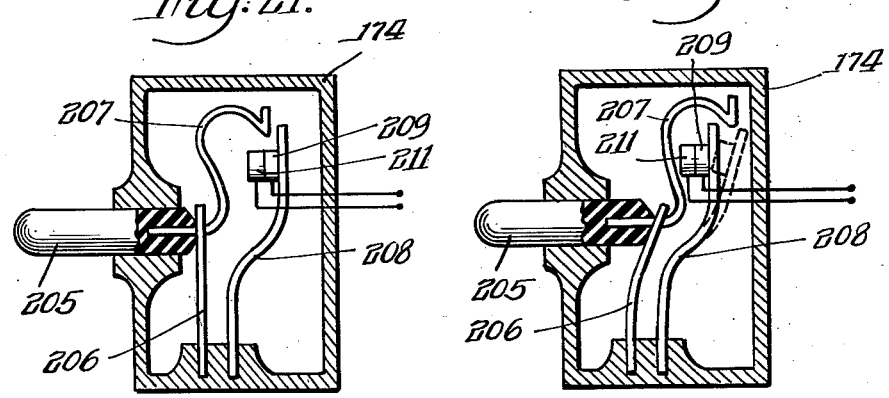
INVENTORS
Frank Freimann
Carl Hart
Arthur I. Knox Sr.
By: Clarence J. Loftus Atty.

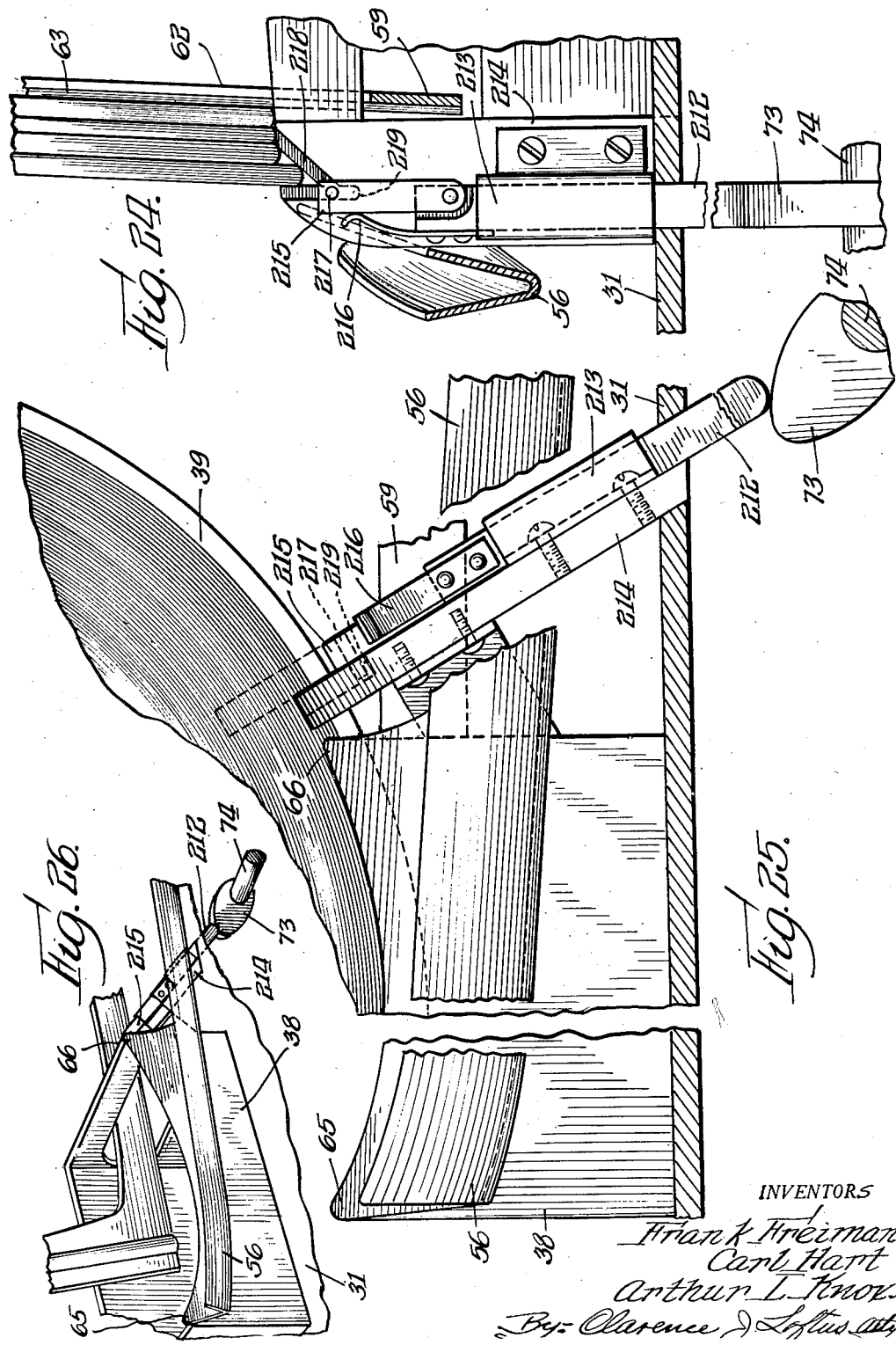

Patented Apr. 29, 1952

2,594,633

UNITED STATES PATENT OFFICE 2,594,633

RECORD CHANGER

Frank Freimann, Carl Hart, and Arthur L. Knox, Sr., Fort Wayne, Ind., assignors to The Magnavox Company, Fort Wayne, Ind., a corporation of Delaware Application November 29, 1945, Serial No. 631,718

8 Claims. (Cl. 274—10)

The present invention relates to phonographs and more particularly to record changers for automatically playing a plurality of records in a desired sequence.

Heretofore for use in homes phonograph record changers have been employed, but in order to make the structure simple and economical so as to reach a large portion of the public certain desirable features have not been incorporated in such changers. In the relatively high priced field a few record changers have been available which would play ten or twelve inch phonograph records intermixed. Such record changers, however, in the past have only played one side of each record, thus necessitating changing the stack of records if it were desired to play a symphonic album or the like consisting of a plurality of records. The simpler more economical phonograph record changers have generally limited the operation to playing only a stack of ten inch records or a stack of twelve inch records. In the one type of record changer, the records are slid off the turntable into a reject magazine. Such an arrangement has the disadvantage of producing additional surface wear on the records due to the sliding action. Other phonograph record changers have been of the drop type, where the first record played dropped the maximum distance, thus placing an appreciable strain on the record particularly if the record were slightly warped, as sometimes happens even though the record is stored carefully in an album and a record cabinet.

It therefore becomes apparent that there still is a need for an improved automatic record changer which will eliminate sliding and dropping and the resultant breakage or wear on phonograph records. Still it is desired to provide a relatively economical record changer which will satisfactorily reproduce phonograph records of all types both standard and non-standard including records having any diameter eccentric groove.

It is therefore an object of the present invention to provide an improved automatic phonograph record changer which will play both ten inch and twelve inch records intermixed.

It is still a further object of the present invention to provide an automatic record changer which will play the phonograph records in sequence on both sides.

Still another object of the present invention is to provide an improved automatic record changer which will play the records in sequence on one side.

A further object of the present invention is to provide an improved automatic record changer which will play standard and non-standard records, warped records and records having any diameter eccentric groove.

Still another object of the present invention is to provide an improved automatic record changer which will eliminate sliding, dropping, and breaking of records.

Still another object of the present invention is to provide an improved automatic phonograph record player in which the records are easily stacked and removed.

Other and further objects of the present invention subsequently will become apparent by reference to the following description taken in connection with the accompanying drawings wherein:

Figure 1 is a perspective view of the phonograph record changer as seen from the top of the mounting support;

Figure 2 is an oblique perspective view having portions broken away to show the relation of certain parts;

Figure 3 is a side view of the record index control;

Figure 4 is another oblique perspective view with other portions broken away to illustrate the relation of the various parts of the record changer;

Figures 5 and 6 are side and end views respectively of the record selector mechanism for removing records one at a time from the record magazine;

Figure 7 is a perspective rear view of the driving and reversing mechanism for rotating a phonograph record;

Figure 8 is a side view partially in cross section showing the record supporting apparatus about to engage a phonograph record;

Figure 9 is a view similar to Figure 8 showing the phonograph record supported and being rotated by the mechanism;

Figure 10 is a perspective view showing the means for positioning the pickup arms in accordance with different diameter records;

Figure 11 is a side view of the cam structure illustrated in Figure 10;

Figure 12 is a detailed view supplementing Figures 3 and 10 to illustrate the manner in which records of different diameters are elevated to the proper position;

Figure 13 is a detailed view of the supporting arrangement for the dual pickup arm;

Figure 14 is an end view showing the dual pickup arm positioned so that the stylus is in engagement with one side of the phonograph record;

Figure 15 is a partial view at right angles to that shown in Figure 14 to illustrate the transverse supporting structure for the pickup arm;

Figures 16, 17, 18 and 19 are diagrammatic representations illustrating certain operations resulting from the action of the sequence operation mechanism to play both sides of a phonograph record and to prepare the phonograph pick-up or tone arm for the next cycle or portion of a cycle of operation;

Figure 20 is a circuit diagram illustrating the electrical connections involved in a cycle of operation of the phonograph;

Figures 21 and 22 illustrate one of the switches used in the circuit diagram of Figure 20;

Figure 23 is a diagrammatic representation illustrating the relative positions of certain cams mounted on the sequence operation cam shaft;

Figures 24 and 25 are end and side views respectively of a modified form of record selector mechanism for removing one at a time records from the record magazine;

Figure 26 is a partial view generally corresponding to Figure 4 illustrating the location of the apparatus shown in the preceding two figures.

The general appearance and assembly of the present invention is illustrated in Figure 1. This assembly includes a mounting support or base 31 which may be provided at the corners by pins 32 surrounded by coiled springs 33. As is customary the pins 32 are intended to fit into suitable apertures in other supporting structures in the cabinet which is to house the mechanism. The springs 33 support in a resilient manner the base 31. Mounted on the base is a starting switch push button 34 and a control button 35. The control button is part of a mechanism which is reciprocable within the limits of an aperture 36 in an escutcheon 37. The control button or member 35 is actuated in one direction to cause the phonograph to play one side of each record, and in the other direction to cause the phonograph to play both sides of each record in sequence. At the other end of the base or support plate 31 there is provided a record magazine or bin 38 in which a plurality of records 39 are stored so as to be played in sequence in the order stored by the automatic record changer mechanism. A record 41 is illustrated as being supported in a position preparatory to playing. The apparatus which supports the phonograph record is not entirely visible in this figure, but there is shown an arm 42 provided adjacent its upper extremity with a resilient extension 43 which carries a record engaging disk 44. The resilient extension portion 43 preferably is so resilient or flexible that a support stop 45 mounted on the arm 42 is provided to limit the deflection or movement of the members 43 and 44. The record has just been elevated to proper position by a record elevator trough 46 positioned directly beneath the record 41. A dual pickup arm assembly 47 is shown in a position just prior to the orientation of the styli of the pickup cartridges of the arm with respect to the outer periphery of the record 41.

After the phonograph record has been played, the arm 42 moves forwardly to carry with it the phonograph record 41 for a short distance. The phonograph record 41 thereupon engages the record removing structure 48 which may be in the form of an inverted U-shaped structure mounted upon the base 31. The record carried to the limit of the removing member 48 is then positioned directly above the return runway or record trough 49 down which the record rolls to the reject record bin or magazine 51. The bin 51 is shown as having therein a plurality of played or rejected records 52 which are supported by an upwardly extending inclined side portion 53 and another portion 54 extending at right angles to the portion 53 so as to engage a portion of the periphery of the rejected records. To supply a new record for subsequent playing there is provided a selector mechanism 55 which is adapted to remove the records one at a time from the storage bin or magazine 38 at the beginning of each cycle of operation. This mechanism will subsequently be described in detail since it is shown in Figures 5 and 6. The record selected by the mechanism 55 eventually rolls down a record guide or trough 56 which is positioned so that a record will continue on to the record elevating trough 46. The elevator trough 46 is raised in an amount depending upon the diameter of the phonograph record to be played. It may be assumed that in Figure 1 all of the records are of the maximum diameter or are twelve inch records. A twelve inch record extends beyond the record trough 46 a distance sufficient to engage an index member 57 which is engaged only by the twelve inch record to control apparatus subsequently to be described so that the trough 46 is elevated a lesser amount than is the case with a ten inch record.

Further details of the structure shown in Figure 1 will be appreciated by a consideration of Figures 2, 3, and 4. The record magazine or bin 38 at one end is provided with an aperture 58 so that a lever arm 59 may move therein. The lever arm 59 is pivotally supported at 61 by a suitable balancing structure mounted on the panel or base 31. The outer extremity of the lever arm 59 extends to the proximity of the center of the longitudinal dimension of the record magazine 38. The outer extremity of the arm 59 has an upwardly extending arm portion 62 which carries a half round strip 63. The half round strip 63 preferably is formed of resilient material such as rubber for example so that this member bears against the center of the records which are stored in the magazine 38. The arm 59 is spring biased by a spring 60 so as to urge the upwardly extending portion 62 and the half round member 63 carried thereby against the records so that as the records are removed one at a time by the selector mechanism 55, the records are urged forwardly against the forward wall 64 of the record magazine 38. The forward wall is provided at each end with suitable upwardly extending fingers or projections 65 and 66 which serve to retain the records in the magazine 38 until removed therefrom by the mechanism 55.

The records are removed from the magazine 38 one at a time by the mechanism 55 the details of which will subsequently be described in connection with Figures 5 and 6. The mechanism 55 is actuated by a bell crank 67 pivotally mounted on the underside of the base 31. The bell crank 67 is biased toward one position by a suitable spring 68 having one end secured to a suitable portion of the base 31. The bell crank 67 is connected to a reciprocable rod 69 suitably supported by guide members 71 and 72. The reciprocable rod 69 is actuated by a cam 73 mounted on a sequence operation cam shaft 74.

This cam shaft 74 carries a gear 75 which is engaged by a worm gear 76 mounted on the shaft of a sequence operation motor 77.

The sequence operation cam shaft 74 carries a number of other cams such as the cam 78 which during a portion of the revolution of the shaft 74 engages the lower extremity of the record engaging arm 42 which is pivotally supported by a plurality of spindles 79. The arm is normally biased outwardly by suitable spring means such as the spring 81 which may have one extremity secured to a stationary point such as a point on the base 31. The cam shaft 74 also carries a cam 82 which engages a cam follower 83 forming a portion of the record elevator mechanism 84. This mechanism will subsequently be described in detail when reference is made to Figure 12. The shaft 74 also carries a cam 85 with a cooperating cam surface 86. The cam surfaces 85 and 86 are adapted to engage forwardly extending portions of a plurality of levers 87 and 88 having upwardly extending extremities and arranged for engagement by a lever 89. The lever 89 is secured to the dual pickup arm assembly 47. The levers 87 and 88 are of different lengths so as to position the pickup arm assembly 47 at different positions dependent upon the diameter of the phonograph record to be reproduced. The arm 87 is provided with a downwardly extending portion 91 which is adapted to be engaged by the pins 92 and 93 carried by cams 94 and 95. The cam 95 is pivotally mounted with respect to the cam 94, as will subsequently be explained in connection with Figure 10. The upwardly extending levers 87 and 88 are pivotally mounted within a certain amount of friction on a suitable support rod 96. The lever 87 is set during each half cycle of operation of the cam shaft 74 by the operation of the pins 92 and 93. The lever 88 is set only when the record index member 57 is actuated by a twelve inch record. Actuation of the member 57 by a twelve inch record moves the member 57 from the solid line position shown in Figure 3 to the dotted line position so that the lower extremity of the rod 97 forming a portion of the assembly 57 engages the upwardly extending arm 88 to move that arm into a position where subsequently the arm 89 will engage the upper extremity of the lever 88.

Prior to the time that either of the arms 87 or 88 is engaged by the lever arm 89 which is attached to the pickup arm assembly 47, the cam 94 or the cam 93 raises the lever arm 89. This upward movement of the lever arm 89 moves the pickup arm assembly 47 outwardly so as to be positioned beyond the outer periphery of the larger size record to be played. Thereafter the arm 89 is lowered until it reaches either one of the stops 87 or 88. The stop 87 is moved into position each half cycle of the operation of the sequence cam shaft 74 so that the pickup arm assembly 47 will be properly positioned with respect to the smaller of the records to be played. If the member 57 has been actuated by a twelve inch record, the lever arm 88 is moved into position so as to position the pickup arm assembly 47 at the outer groove of the larger phonograph record. The arm 89 and the pickup arm assembly 47 are dynamically balanced so that it is necessary to apply a force to the arm 89 to move the arm downwardly to engage either the levers 87 or 88. After either the cam 94 or the cam 95 has raised the lever arm 89, the cam subsequently engages a spring member 98 secured to the underside of the arm 89 to move the arm downwardly. The member 98 is formed of resilient material so as to permit the cam to move past this member after the outer extremity of the arm 89 has been stopped in its downward motion by either of the levers 87 or 88.

The operation of the levers 87 and 88 and the cams 94 and 95 will be better understood by reference to Figures 10 and 11 from which it will be seen that the lever 88 is pivotally mounted at 99 on a sleeve member 101 mounted on the shaft 96. The arm 88 is biased to its upright position by suitable spring means such as a leaf spring 102. The arm 88 is pivotally mounted so that during one portion of one half of the revolution of the cam shaft 74 the arm is swung out of the path of the lever arm 89. This is accomplished by the cam 86 which at the same time restores the lever arm 87 to its original position. The lever arm 87 being restored to its original position therefore no longer limits the downward movement of the lever arm 89. The angular displacement of the rod 88 from the path of the arm 89 no longer limits its downward movement, and hence during the reproduction of the phonograph record the arm may move downwardly until the stylus of the pickup arm 47 reaches the eccentric circle at the inside of the record. After the time for playing the second side of the phonograph record has passed, the cam shaft 74 rotates the cam surface 85 against the forwardly projecting arms of the levers 87 and 88 to restore these arms to their original position so that they may be actuated to new positions in accordance with the next record to be played.

The cam 95 is pivotally connected to the structure which supports the cam 94 by a pair of pivots 103. The cam 95 is so constructed as may be seen in Figure 11 that it may be displaced to or in the direction of the dotted line representation shown. This is brought about by the engagement of the shifting cam surface 104 which is adapted to be engaged by a lever 105 shown in Figure 4. Subsequent to engagement with the lever 105 the cam 95 is restored to its original position by a spring 106. The lever 105 shown in Figure 4 is an upwardly curved projecting arm of a bell crank lever 107 pivotally mounted at 108. One extremity of the bell crank 107 is connected to a longitudinal link 109 which is pivotally connected to the downwardly depending portion 111 of the push button 35. The bell crank 107 at an intermediate point is provided with an upright finger or member 112 which may have a certain degree of resiliency and which is intended to engage one side of a shiftable cam 113, the purpose of which subsequently will become apparent. The slide button 35 when actuated to the position shown in Figure 4 moves the bell crank 107 so that the member 112 is in engagement with the shiftable cam member 113. At the same time the outwardly extending curved arm 105 is projected into the path of the cam 95 so as to deflect this cam out of the path of the lever 89.

The mechanism 55 for supplying phonograph records one at a time from the record magazine 38 to the record track 56 and to the record elevator trough 46 is shown in detail in Figures 5 and 6. The apparatus 55 is mounted on an inclined support 114 which extends through the mounting base 31 and which terminates at the record magazine 38 in the proximity of the projection 65. The support 114 adjacent its lower end carries a reciprocable member 116 which is connected to the bell crank 67 shown in Figure 4. The member 116 is connected to a pivoted member 117 which is biased to an upright position by a suitable spring 118. The member 117 is arranged for limited pivotal movement in a counterclockwise direction as seen in Figure 6. The member 117 is provided with a groove or passageway 119 for cooperation with a pin 121 which is fixedly secured to the inclined support 114. The member 117 also carries a resilient or spring member 122 having an inwardly turned upper end 123 which extends toward the inclined support 114 sufficiently so as to normally block the upper end of the groove or passage 119. The member 117 adjacent its upper end carries a relatively thin support plate 124 to which is secured by means of a rivet 125 a backing plate 126. The backing plate 126 adjacent its lower end carries an elongated member 127 having a forwardly projecting step 128 which is arranged to engage the underside of an edge of a phonograph record. The member 126 adjacent its upper extremity carries a friction pad 129 which may as shown have a circular configuration and which is adapted to engage frictionally one side of a phonograph record. In operation the cam shaft 74 rotates the cam 73 shown in Figure 4 to reciprocate the rod 69 and actuate the bell crank 67 against the action of the spring 68. This pushes upwardly the lower member 116 which elevates the member 117. The member 117 carries the spring 122 which then encounters the pin 121, causing the member 117 to be deflected in a counterclockwise direction. This positions the step 128 beneath the edge of a phonograph record, and the friction pad 129 against one face of the record. The member 116 continues its upward motion so as to raise the members 127 and 129 to the dotted line representation shown in Figures 5 and 6, which then will cause the record to be lifted above the projection 65 on the magazine 38. At the upper limit of the movement of the member 116, the pin 121 will be positioned opposite the lower entrance to the groove 119. When this occurs the spring 118 shifts the member 117 in a clockwise direction somewhat beyond the position shown in solid lines in Figure 6. When this occurs the phonograph record is released into the record trough 56 from whence it rolls down on to the elevator trough 46. The reciprocable member 116 begins its return motion so that the pin 121 relative to the groove 119 moves upwardly and eventually encounters the underside of the turned-in portion of the spring 123. Further return of the member 116 causes the pin 121 to deflect the spring 123 so that the pin eventually reaches the upper extremity of the groove 119 and becomes positioned relative to the groove and the member 117 as shown in Figure 6. When this occurs the cam 73 is moved to a dwell position but the mechanism is in readiness for actuation to supply a new record when the previous record has been reproduced and moved into the reject magazine 51.

When the phonograph record is supplied by the mechanism 55 heretofore described, the record goes down the trough 56 into the elevator trough 46. If the record is of the larger diameter as is the case with the twelve-inch record, the record will engage the member 57 shown in Figure 12. The member 57 is mounted for limited reciprocable movement by suitable support means such as the sleeve 131. When the member 57 is moved, a projection 132 is secured to the rod 97 which is positioned above an outwardly extending projection 133 mounted on the inner sleeve 134 of the record elevator mechanism 84. The inner sleeve 134 is mounted within a suitable bearing sleeve or support 135 secured to the mounting base 31. The sleeve 134 has a lower aperture equal to the diameter of the push rod 83. The sleeve 134 has a larger inner diameter so as to accommodate a coiled spring 136 extending between the lower extremity of the sleeve 134 and the upper extremity of the push rod 83. While the spring 136 is for purposes of illustration described as being contained within the sleeve 134 and secured in a particular manner, it is intended that this illustrate the manner of operation since it is desired to have a certain degree of freedom of motion between the member 83 and the member 134. The cam 82 continues to rotate in a counterclockwise direction. This elevates the push rod 83 which acts against the spring 136 to lift the sleeve 134 until the projection 133 strikes the projection 132 of the rod 97. At this point the upward movement of the trough 46 ceases. Further movement of the push rod 83 merely flexes the spring 136. If the spring is mounted in the manner described the spring merely stretches during this operation. It of course will be appreciated that if desired a compressible spring might be used to interconnect the push rod 83 and the inner sleeve 134.

If the member 57 shown in Figure 12 is not actuated, as is the case when a ten-inch record is brought into position for playing, the elevator trough 46 rises to a higher level since there is no stop in the path of the projection 133 mounted on the side of the inner sleeve 134. Thus the smaller diameter record is elevated to a greater extent than is the larger diameter record.

When the elevator trough 46 has reached its proper height the cam 78 is moved to a position where the lower extremity of the arm 42 is engaged, thus pivoting the arm against the action of the spring 81 to move the upper extremity outwardly. This occurs just prior to the time that the record enters the trough 46. Thereafter the cam continues to move on until the lower extremity of the arm 42 has been released, whereupon the spring 81 pushes the lower extremity so as to cause the upper extremity to be moved inwardly. The upper extremity of the arm 42 carries the resilient member 43 which may be secured to the arm by any suitable means including an imbedded support button 137. Within the member 43 there is mounted a bearing member 138 which carries a shaft 139. The shaft 139 is provided with an annular groove 141 into which may be positioned a limiting set screw 142 to prevent the shaft from leaving the bearing 138. The lower extremity of the shaft 139 and the recess of the bearing 138 are provided with conical surfaces sufficient to accommodate an end thrust ball bearing 143. The shaft 139 carries the record engaging disk 44. The shaft 139 has a tapered outer extremity 144. The outer extremity 144 is adapted to pass through an opening 145 in the phonograph record 41 and into a recess 146 in a shaft 147. The shaft 147 is mounted in a bearing member 148 secured to an upright support 149 which is carried by the support base 31. The shaft 147 at one extremity is secured to a record engaging disk or plate 151. The other end of the shaft 147 is connected to a driving wheel 152. It will be noted that the shaft 147 extends beyond the wheel 152 so that this shaft may be provided with a suitable upright wheel to insure a relatively constant speed of rotation of the disk 151 and the phonograph record 41.

As may be seen from Figures 7 and 9 the wheel 152 has an outer periphery of a friction material 153 of rubber or the like. The wheel 152 is engaged by one of a plurality of drive shafts 154 and 155 which are connected respectively to wheels 156 and 157. Each of these wheels is also provided with an outer periphery of a high friction material such as rubber. The wheels 156 and 157 are mounted on shafts 154 and 155 extending through a support plate 159 having a downwardly extending projection 161 connected to a spring 162 one end of which is connected to a mounting support 149. A rod 163 is connected to the plate 159 so that the rod may place either of the wheel 154 and 155 in engagement with the wheel 152. The outer peripheries of the wheels 156 and 157 are in alignment so that the wheel 156 drives the wheel 157. The wheel 156 is driven by a wheel 164 mounted upon a shaft 165. The shaft 165 is driven by a motor 166. When the wheel 154 is in engagement with the wheel 152 the phonograph record is rotated in one direction, and when the other wheel 155 is in engagement with the wheel 152, the phonograph record 41 is rotated in the opposite direction.

The lever 163 connected to the plate 159 extends downwardly through the mounting base 31 as shown in Figure 4. The lower extremity of the rod 163 is bent at right angles to engage a slot 167 in the upright portion of a reciprocable slide 168. Preferably the connection between the end of the rod 163 and the slot 167 is formed with a certain degree of freedom to permit a small limited movement of the slide 168 without affecting the position of the rod 163. The rod 163 at one extremity carries the pivoted cam member 113. This same extremity of the slide 168 has an upwardly extending arm 169 which engages a slot in a bell crank 171. The bell crank is biased to a certain position by a spring 172. The bell crank 171 at the extremity of the other arm is provided with divergent portions 173 adapted to engage the push rod of a switch 174. The bell crank 171 is secured to a rod or shaft 175 which supports the pickup arm assembly 47.

Reference may now be made to Figures 13, 14, 15, which illustrate the manner in which the pickup arm assembly is supported. Figure 13 shows the bell crank 171 mounted on the shaft or rod 175 which is supported by suitable brackets 176 secured to the underside of the mounting plate 31. The shaft 175 is composed of two sections interconnected by a U-shaped channel member 177. The channel member 177 in each of its sides is provided with a pair of elongated slots 178 which receive a plurality of pins 179. The pins 179 are carried by a mounting block 181 which has transversely extending shafts 182 upon which the pickup arm assembly is pivotally supported. The block 181 is provided with trunnions 183 extending into the two portions of the shaft 175 as may be seen from Figure 15. Rotation on the shaft 175 by the bell crank 171 displaces the pickup arm assembly 47 in one direction or the other in order to engage a pickup stylus with a surface of a phonograph record 41. In Figure 14 the pickup arm assembly 47 has been tipped in a counterclockwise direction for the reproduction of one side of a phonograph record. The pickup arm assembly 47 together with its actuating lever 89 is statically balanced by a counterweight 184, the position of which may be adjusted by screw means 185. After the bell crank 171 has moved the tone arm or phonograph pick-up to one side of the record or the other, the slots 178 carrying the pins 179 permit a certain degree of freedom between the pickup arm assembly 47 and the position as determined by the shaft 175 to accommodate phonograph records of different thickness and to permit limited movement of the pickup arm assembly 47 during reproduction due to slight unevenness of the phonograph record. The pivots 182 upon which the pickup arm assembly 47 rests permit the arm 89 to move the pickup arm extremities in and out relative to the outer periphery of the phonograph record, and also permit the phonograph pick-up stylus to follow the groove in the record during reproduction.

The slide 168 carries the pivoted cam 113. When operation of a phonograph is to be initiated the push button 34 is depressed. This push button acts upon a rod 186 having a transversely extending arm 187 arranged to engage electric switches 188 and 198. The switch 198 permits manual playing of individual records. The rod 186 engages one end of a lever 189 secured to a shaft 191 mounted in a bearing 192. The other end of the shaft 191 carries a resilient finger 193 adapted to be moved into engagement with the pivoted cam 113 whenever the push button 34 is actuated. This shifts the cam 113 in a counterclockwise direction so that upon initiation of operation of the phonograph the phonograph will begin playing a certain side of the phonograph record. The resilient finger 193 therefore moves the cam 113 to the position shown in Figure 16. The cam 94 as seen in Figure 16 engages the left surface of the cam 113. The cam 94 moves on downwardly against the cam surface, thus completing a reciprocable movement toward the right of the slide 168. This movement actuates the rod 163 upwardly so as to move the plate 159 of Figure 7 to bring the wheel 155 into engagement with the wheel 152. The upward movement of the rod 163 causes the spring 162 to be depressed as the extremity 161 passes over dead center, thereby insuring positive engagement of the wheel 155 with the wheel 152 in spite of the fact that a certain amount of freedom is permitted between the slot 167 of the slide 168 and the rod 163.

As the cam 94 continues on down the left face of the pivoted cam 113, this cam is tilted to the opposite position shown in Figure 17. The cam 113 has a certain degree of freedom between two limits represented by the limit stops 194. When the cam reaches a position approximately that shown in Figure 17, the cam shaft 74 is stopped since at this time the actuation of the slide 168 has caused the arm 169 to move the bell crank 171. The divergent fingers 173 of the bell crank are arranged to engage the switch 174 which is so connected in an electrical circuit shown in Figure 25 to bring about interruption of the current supply for the sequence operation motor 77. The phonograph pick-up arm moves on to reproduce the phonograph record, and when the eccentric circle at the inside of the record is reached by the pickup stylus, the arm 89 secured to the tone arm 47 is moved to engage an electric switch 195 which again causes current to be supplied to the electric motor 77. The cam 94 then continues on from the position shown in Figure 17 to give a slight movement to the slide 168. Subsequent to this slight motion of the slide 168 the spring 172 acting on the bell crank 171 will cause the pick-up arm assembly 47 to be restored to a neutral position so that when the cam 94 or the cam 95 next engages the outer extremity of the lever 89, the extremities of phonograph pick-up arm 47 may be moved outwardly away from the record. It may be assumed that both sides of the phonograph record are to be played, whereupon the cam 95 will engage the right side of the pivoted cam 113 in a manner illustrated in Figure 18. The cam 95 continues on down to the position generally indicated in Figure 19 to move the slide 168 to the left, thus causing the rod 163 to be pulled downwardly. The downward motion of the rod 163 causes a compression of the spring 162 and a shift of the plate 159 so that the new position assumed by the plate 159 will be that shown in Figure 7. This shift in the plate 157 brings into engagement the wheel 154 with the wheel 152, thus reversing the direction of rotation of the phonograph engaging plate 151. The cam 95 eventually leaves the cam surface 113 with the cam 113 in the position shown in Figure 19, which it will be noted corresponds to the position of the cam shown in Figure 16. Thus when the cam 94 reaches the cam surface 113 for the reproduction of a subsequent record, the extremities of the pickup arm 47 will again be displaced first to a side of the record corresponding to the first side originally played on the first record by the phonograph.

If it is desired to cause the phonograph to play only one side of each record the slide 35 is moved to the position shown in Figure 4 so that the resilient upright finger 112 constantly bears against the cam 113. Under such operation the cam 94 will pass through the stages shown in Figures 16 and 17 and as soon as the cam 94 has cleared the cam 113, the resilient finger 112 will restore the cam 113 to the position shown in Figure 16. When the cam 95 moves toward the position where the cam would engage the cam surface 113, the cam surface 104 carried by the cam 95 engages the curved finger 105 extending from the bell crank 107 which deflects the cam 95 so that the cam never engages the pivoted cam surface 113. This causes the cam shaft 94 to continue to rotate so that the cam surface 78 engages the lower extremity of the arm 42 to withdraw the phonograph record from engagement with the driving plate 151. The arm 42 continues to move outwardly due to the action of the spring 81 until the phonograph record is engaged by the removable apparatus or U-shaped arm 48 which strips the record 41 from the projecting spindle 144 so that the record engages the runway 49 and travels on to the reject magazine 51.

The electrical circuit diagram for the phonograph is shown in Figure 20. A pair of conductors 196 are arranged to be connected to a suitable source of alternating current. One of the conductors leads to a manually operable switch 197 by means of which all power to the phonograph may be controlled. In order to initiate operation of the phonograph, the switch 197 is closed so that current may be supplied to the phonograph motor 166 by way of the conductor 198 connected to one contact of a pair of switch contacts 199. The pair of switch contacts 199 are controlled by the cam 73. The conductor 198 also is connected to one of a pair of contacts 201 which form a switch located adjacent the front edge of the record magazine 39. As long as any record remains in this magazine the switch 201 is closed, but when the last record has been removed, the switch will open. Current from the switch contacts 199 and 201 is supplied by the conductor 202 to one side of the phonograph record turning motor 166. The return conductor 203 of the motor 166 is connected to one of the pair of conductors 196. A control circuit is provided for the motor 77 which operates the sequence operation shaft. One side of the motor is connected to the alternating current line conductor 196. Another conductor extends from the motor 77 to the switch contacts of an alternating current relay 204. A plurality of switches 174, 188 and 195 are arranged in a circuit for controlling the energization of the coil of the relay 204. The switch 174 is a normally closed switch which when actuated merely interrupts the circuit momentarily. The switch 188 is a normally open switch which is closed by actuation of the push button 34. The switch 195 is also a normally open switch which is actuated by the arm 89 of the tone arm whenever one side of a phonograph record has been reproduced. The two switches 195 and 188 are connected in parallel between the coil of the relay 204 and the normally closed switch 174. The normally closed switch 174 is connected to the conductor 202.

After the switch 197 has been closed, the push button switch 34 is actuated to momentarily close the normally open contact switch 188, which therefore permits current to be supplied to energize the coil of the relay 204 which closes its contacts. Closing the contacts of relay 204 locks the relay 204 in circuit and at the same time supplies power to the sequence operation motor 77. This motor continues to operate until the extremities of the pickup arm assembly 47 are moved into position with a pickup stylus in contact with one side of the phonograph record, whereupon the bell crank 171 with its divergent arms 173 is moved to actuate the switch 174. Actuation of the switch 174 momentarily interrupts the flow of current through the relay 204 which opens thus stopping the operation of the motor 77. The pickup stylus moves toward the inside of the phonograph record and when the eccentric groove or circle is reached the lever 89 actuates the switch 195 thereby again completing a circuit through the energizing coil in the relay 204 which again locks itself into position. Assuming that another side of the record is to be played, the extremities of the pickup arm assembly 47 are moved to neutral position and then moved to the other side of the record whereupon again the divergent arms 173 actuate the switch 174 to momentarily interrupt the circuit and stop the operation of the sequence operation motor 77. Thus both sides of the phonograph record are reproduced. Where only one side of the phonograph record is to be reproduced, the switch 174 is actuated only once for each phonograph record. When all of the phonograph records in the record chamber or magazine 38 have been removed, the switch 201 is opened thus preparing a circuit which subsequently will stop all operation of the phonograph. The switch 201 is in closed circuit relation and in parallel to the switch 199 so that as long as phonograph records are still to be played, the periodic actuation of the switch 199 by the cam 73 will not interrupt the circuit. After the last phonograph record has been reproduced the switch 201 is open and the cam 73 moves to a position where it opens the switch contacts 199, thereby interrupting the circuit to both electric motors 77 and 166. The phonograph cannot be actuated until more records are placed into the record magazine 38, or the switch 190 is closed.

It has been stated that the switch 174 is of the type which is normally closed and which only momentarily interrupts the circuit when actuated. Any suitable type of switch may be used for this purpose and one type of switch is illustrated in Figures 21 and 22. The switch 174 has an actuating rod 205 which is biased outwardly by a spring member 206. The rod 205 carries a curved spring 207 which is adapted to engage a contact arm 208. The contact arm 208 carries a contact 209 which normally is in engagement with a fixed contact 211. When the rod 205 is actuated the upper extremity of the spring 207 pushes against the contact arm 208 to move it to the dotted line position shown in Figure 22. As the rod 205 continues to be positioned inwardly the end of the contact arm 208 moves past the forward extremity of the spring actuator 207 to return to the solid line position shown in Figure 22. Subsequently the pickup arm assembly 47 is returned to neutral position thus releasing the push rod 205 which is restored to its original position by a spring 206. In the restoring movement the upper end of the spring actuator 207 deflects in passing over the outer extremity of the switch contact arm 208 since that arm will not move as its contact 209 is in engagement with the fixed contact 211.

While Figures 5 and 6 have shown one manner of transferring phonograph records one at a time from the record magazine 38 to the record trough or track 56, other means may be employed. Another suitable means for supplying the phonograph records one at a time to the trough 56 is illustrated in Figures 24, 25, and 26. The cam shaft 74 carries the cam 73 which acts against a rod 212. Since the rod 212 is angularly displaced from an actuating rod of the mechanism of Figures 5 and 6, the cam 73 is correspondingly displaced on the shaft 74. The rod 212 is supported and guided by a guide member 213 secured to an inclined plate 214 extending through the mounting base 31. The plate 214 extends outwardly to the proximity of the upwardly extending record retaining finger or ear 66 of the record magazine 38. The rod 212 adjacent its upper extremity carries a pivoted rod 215 biased by a spring 216 so as to urge the upper extremity of the rod 215 toward the records in the magazine 38. The rod 215 adjacent its upper extremity carries a pin 217 arranged for operation in a generally V-shaped groove 218. The groove 218 is formed in the upper portion of a support member 214. The side of the record magazine 38 adjacent the upwardly extending finger portions 66 is inclined downwardly to conform generally to the upper edge of the groove 218. This permits the foremost record to drop down slightly as indicated in Figure 24. At the bottom of the groove 218 there is a downwardly or vertically extending groove portion 219. In Figures 24 and 25 the cam 73 is just approaching the position where the rod 212 is to be moved upwardly. A partial upward movement has taken place so that the pin 217 is about to enter the right hand portion of the V-groove 218. The pin 217 will follow the groove 218 as the rod 212 moves upwardly until the upper edge of the rod 215 engages the underside of the foremost phonograph record. The weight of the record upon the upper end of the rod 215 is sufficient to prevent the spring 216 from further deflecting the arm 215 in a clockwise direction as seen in Figure 24. The rod 212 continues upwardly until the cam 73 has reached its maximum position. At this point the phonograph record is moved upwardly sufficient so as to clear the projection 66 on the record magazine 38. This raising of the phonograph record as would be seen from Figure 25 produces a lifting or rotation of the record in a counterclockwise direction. The record having cleared the upward projection 66 of the magazine 38 thereupon drops into the record trough 56 and rolls on down to the record elevator trough shown in Figures 2 and 4. The cam 73 continues on to permit the rod 212 to return. As the record was supplied to the record trough 56, the succeeding records were moved forwardly so that when the record left the upper extremity of the rod 215, the rod was maintained in a generally horizontal position by the next succeeding record. The rod 212 in moving downwardly then causes the pin 217 to engage the left hand leg of the V-trough 218 as seen in Figure 24. The pin 217 continues on down into the vertical groove 219 where it remains until the cam 73 again brings about an upward movement of the rod 212.

From the foregoing it will be seen that there again has been provided an arrangement for supplying the records one at a time to the record elevating mechanism and that this apparatus is actuated in accordance with the sequence operation mechanism of which the cam shaft 74 is a part.

*Operation*

The invention will more readily be understood by assuming a certain operation for an automatic phonograph. First it will be assumed that the operator selects a number of twelve-inch phonograph records which are to be placed in the record magazine 38. The operator deflects the arm 59 having the upright extension 62 and places the phonograph records in order in the bin 38. The arm 59 is then permitted to bear against the records and to support them. The curved half round strip 63 engages the records at about their central point, thus urging the records forwardly against the record stops 65 and 66. The operator then determines whether one side or both sides of the records are to be played in sequence. It may first be assumed that both sides of the records are to be played whereupon the operator checks to see that the push button 35 which operates in the aperture 36 of the escutcheon 37 is moved to the right as far as possible. Thereafter the operator may close the main power switch 197 of Figure 20. The push button 34 is then actuated which causes the extension lever 187 to strike the push rod of the switch 188.

The switch 188 having been closed by the action of the push button 34 completes an electrical circuit through the relay 204 which attracts its armature and locks itself in circuit. The closing of the relay 204 brings about energization of the record sequence operation motor 77. The closing of the switch 197 completed the circuit to the record driving motor 166 through the record switch 201 which is held closed as long as a record remains in the record magazine 38.

The sequence operation motor 77 by means of the gears 75 and 76 drives the cam shaft 74. This cam shaft is provided with a plurality of cams which in their proper relation are diagrammatically indicated in Figure 23. This diagrammatic representation in Figure 23 has been given since otherwise it is difficult to determine from the perspective views and the broken away figures the exact preferred relationship between the various cam members on the cam shaft. The initial actuation of the push button 34 causes the rod 186 to engage the lever 189 to rotate the shaft 191 supported in the bearing 192. The shaft 191 at its other extremity carries a resilient finger 193 which is moved against the pivot cam 113 supported at one end of the slide 168. The momentary action of the resilient finger 193 against the pivot cam 113 positions the cam so that the operation of the phonograph will begin with the playing of the particular side of the first record. The cam 73 begins to rotate, the cam 78 already being in engagement with the lower extremity of the arm 42 since the last played record prior to the restoration of the record to the reject bin 51 brought about an operation where the arm 42 withdrew the record from the driving disk or wheel 151. The arm 42 already being engaged by the cam 78 remains pivoted outwardly so that when a record is supplied, the arm 72 is moved outwardly in readiness to accept the record. The first action occurring as a result of the rotation of the cam shaft 74 is the movement of the cam 73 against the push rod 69. The rod 69, supported in bearing members 71 and 72 shown in Figure 3, actuates the bell crank 67 against the action of the spring 68. The bell crank 67 moves upwardly the rod 116 thus actuating the record selecting mechanism 55.

The record selecting mechanism 55 which withdraws the records one at a time from the record magazine 38 is shown with particularity in Figures 5 and 6, the various parts of which have previously been described. The upward movement of the rod 116 causes the record engaging pad 129 to be moved upwardly and toward the first record. The step portion 128 of the member 127 engages the underside of the outwardly extending portion of the record as is apparent from Figures 5 and 6. At about the limit of the upward movement the record has been raised sufficiently so that it clears the record retaining ear 65 of the record magazine 38. The record thereupon slides into the trough 56 whereupon it disengages itself from the record retaining ear 66. The record thereupon rolls down the trough 56 and comes to rest in the record elevating trough 46. Since the record in the trough 46 is a twelve-inch record, the outer periphery engages the record index arm 57. The displacement of the arm 57 by the twelve-inch record brings the projection 132 immediately above an outwardly extending projection 133 on the sleeve 134 of the record elevating mechanism as seen in Figure 12. The lower extremity of the rod 97 as is apparent from Figure 10 engages the pivoted lever arm 88 supported on the shaft 96. Thus the rod 88 is moved to a vertical position so as to constitute a limit stop for the arm 89 which is secured to the dual pickup arm assembly 47. The cam 82 on the cam shaft 74 engages the cam follower 83 which is connected by a spring 136 to the record elevating trough 46. The trough 46 is raised to a limit determined by the cooperating stops 132 and 133. At the time that this upward limit is reached, the cam 78 goes off over the lower extremity of the arm 42.

The disengaging of the cam 78 with the lower extremity of the arm 42 permits the centering pin 144 to engage the aperture 145 in the phonograph record 41. The pin 144 moves on into the aperture 146 in the shaft 147 until the relationship of the parts is like that shown in Figure 9. The spring 81 acting against the lower extremity of the arm 42 places a sufficient bias against the upper extremity of the arm 42 so that the phonograph record 41 is firmly engaged between the driving plate 151 and the disk 138 supported rotatably from the arm 42. The resilient mounting 43, which carries the shaft 139, the centering pin 144 and the record disk 44, firmly engages the phonograph record 41 irrespective of differences in thicknesses between the records supplied. The resilient structure 43 accommodates any axial displacement between the axes of the shaft 146 and the shaft 139.

The cam shaft 74 continues to rotate thus bringing the cam 94 into further engagement with the arm 89 secured to the pickup arm assembly 47. At the beginning of the operation of the sequence operation motor 77, the cam 94 is positioned so as to be in engagement with the outer extremity of the arm 89 since the extremities of the pickup arm assembly 47 were restored to a position beyond the outer extremity of the phonograph record prior to the time that the last phonograph record in the previous cycle of operation had been removed from the arm 42. The cam 94 therefore continues for a short time to act against the arm 89, whereupon it leaves the arm to engage the resilient spring 98. The spring 98 being engaged by the cam 94 moves the tone arms 47 inwardly so that the styli are in the proximity of the outer periphery of the phonograph record. The amount of movement of the extremities of the pickup arm assembly 47 is determined by the upright limit stop 88 which it will be recalled had been moved into position by the engagement of the index member 57 with the outer periphery of the twelve-inch record. The arm 89 therefore moves downwardly by the action of the cam 94 on the spring 98 until the arm 89 is stopped by the upwardly extending arm or limit stop 88. Thus the extremities of the pickup arm assembly 47 are arranged so that the pickup styli are located in the proximity of the outer groove of the phonograph record.

After the extremities of the pickup arm assembly 47 have been positioned as described the cam 94 leaves the spring 98 and continues on to engage the pivoted cam surface 113 as shown in Figures 16 and 17. The cam 94 moves on downwardly along the left side of the pivoted cam 113 thus bringing about a movement toward the right of the transversely arranged slide 168. This movement of the slide 168 produces an upward movement of the rod 163 which as is apparent from Figure 7 causes the wheel 155 to be placed in engagement with the driving wheel 152. Thus the movement of the slide 168 determines the direction of the rotation of the phonograph record driving disk 151. The movement of the slide 168 also brought about movement of the bell crank 171 due to the interconnection of the bell crank with the slide through the upright extending arm 169. The movement of the bell crank 171 brings about a rotation of the shaft 175 which as is apparent from Figure 13 supports the pickup arm assembly 47. Thus the assembly 47 is moved to the position shown in Figure 14.

At the same time the action of the bell crank 171 is such that the divergent extremities 173 engage the switch 174. The closure of the switch 174 which is constructed in the manner illustrated in Figures 21 and 22 momentarily interrupts the circuit through the relay 204. The relay 204 therefore opens its contacts and interrupts the flow of energy to the sequence operation motor 77 thereby bringing about a cessation of the motion of the sequence operation cam shaft. Each stylus follows the grooves of the record until the one side of the phonograph record has been played and the stylus reaches the concentric circle of the record.

While the cam 94 is moving from the spring 98 on the lever 89 and into engagement with the pivoted cam 113, the cam 86 is brought into engagement with the horizontal extension of the limit stop 88 thereby deflecting the stop 88 out of the path of the arm 89. Thus the arm 89 may continue on while the stylus of the pickup arm assembly 47 reproduces the record. Prior to the previous operation of the phonograph, the pin 92 projecting from the face of the cam 94 had oriented the ten-inch record stop 87 to a vertical position. At the time that the cam 86 rotates to disengage the twelve-inch limit stop 88, a portion of the cam surface acts to restore the ten-inch limit stop 87 to its original position so that this limit stop is also moved out of the path of the downwardly moving lever arm 89.

At the end of the reproduction of the phonograph record the lever arm 89 moves into engagement with the switch 195. The switch 195 is connected in parallel with the starting switch 188 and again completes a circuit to the relay 204. The relay 204 closes its contacts thus re-energizing the sequence operation motor 77. The cam shaft 74 rotates to bring the cam 94 out of engagement with the pivoted cam 113 thereby permitting a small limited movement of the slide 168. This small limited movement which is permitted is brought about by the restoring spring 172 connected to the end of the bell crank 171. Thus the bell crank 171 is returned to normal position thus slightly rotating the shaft 175 and restoring the extremities of the pickup arm assembly 47 to a vertical position where neither one of the styli is in engagement with the surface of the phonograph record.

The cam shaft 74 rotates to move the pin 93 against the downwardly extending extremity 91 of the ten-inch record stop 87 thus moving it to a vertical position. The cam 95 moves on upwardly to engage the outer extremity of the arm 89 thereby moving the extremities of the pickup arm assembly 47 outwardly away from the record. The cam 95 continues on until it engages the spring 98. Meanwhile the cam 86 has been moved so that the angularly displaced twelve-inch limit stop 88 has been restored to its former position. The stop 88 therefore limits the downward movement of the arm 89.

The cam 95 acting on the spring 98 moves the assembly 47 back to the starting groove of the phonograph record. The limit stop 88 engaging the outer extremity of the arm 89 stops this movement, and the cam 95 continues on to engage pivoted cam 113 as is indicated in Figures 18 and 19. The action of the cam 95 on the cam 113 therefore moves the slide mechanism 168 toward the left thus causing the slot 167 to pull downwardly on the rod 163. This downward motion of the rod 163 shifts the driving wheels shown in Figure 7 to the position shown therein so that the rotation of the driving disk 151 is in the opposite direction. The record is still supported by the arm 42 because of the action of the spring 81 which is not opposed by any portion of the cam 78. The action of the slide 168 toward the left causes the upward projection 169 to actuate the bell crank 171. This pivots the shaft 175 to move the pickup assembly 47 so that the other stylus engages the opposite side of the phonograph record. One of the outer extremities 173 of the bell crank 171 engages the switch 174 which momentarily interrupts the circuit shown in Figure 20.

This interruption of the circuit to the sequence operation motor 77 by the actuation of the switch 174 causes the relay 204 to be de-energized. The pickup arm continues to reproduce the phonograph record, the cam 95 having moved on down the surface of the pivoted cam 113. During this movement of the cam 95, the cam surface 85 has engaged both of the limit stops 87 and 88 shown in Figure 10 to restore them to the solid line position. The engagement of the cam surface 85 restores both these limit stops so that the arm 89 may move during reproduction of the phonograph record toward the switch 195. When the other side of the phonograph record has been reproduced the switch 195 is actuated thereby again energizing the relay 204 to re-energize the sequence operation motor 77. This energization of the sequence operation motor 77 causes the shaft 74 to be rotated so that the cam 95 clears the pivoted cam 113 to permit the slide to be restored a short distance so that the bell crank 171 returns to its normal position.

In this position both styli of the pickup arm assembly 47 are freed from the surfaces of the phonograph record. The cam surface 94 thereupon engages the outer extremity of the lever 89 to move the extremities of the pickup arm assembly 47 away from the outer periphery of the record. The cam surface 78 now engages the lower extremity of the arm 42 to cause the pin 144 to be withdrawn from the recess 146. The phonograph record 41 remains on the pin 144 until the disk 138 passes through the record removing wire structure 48. When this occurs the record drops into the return track 49 and rolls into the record reject chamber 51. At this point in the sequence of operations the phonograph mechanism is ready to supply another phonograph record from the magazine 38 provided that the magazine contains such record. If the magazine does not contain a record the switch 201 is opened and the cam 73 now moves to a position where it will open the pair of contacts 199. If both contacts 199 and the switch 201 are opened, the entire operation of the phonograph ceases.

Operation for ten-inch record

It may now be assumed that the records to be placed in the phonograph magazine are ten-inch records or that the next record to be played following the preceding description is a ten-inch record. In general the sequence of operations is the same, and it is believed unnecessary to repeat in detail each action. Only enough action will be given together with those actions which are changed in response to a ten-inch record.

It may be assumed that the phonograph sequence operation motor 77 is continuing to operate so that the cam 73 moves the rod 69 to actuate the bell crank 67 and the record selecting mechanism 55. A ten-inch record therefore is removed from the record magazine 38 which rolls down the record trough 56 to the record elevating trough 46. The ten-inch record in the trough 46 does not engage the record index member 57. If the index member 57 previously has been actuated by a twelve-inch record, the latter half of the preceding cycle of operation of the cam shaft 74 is operated to restore this member to its original position since the cam 85 in restoring both the limit stops 87 and 88 has caused the lower extremity on the rod 97 to be moved on the left as seen in Figure 10. This brings a movement toward the left of the stop 132 seen in Figure 12 so that unless the member 57 is again actuated this stop is not in position to engage the stop 133. The stop 133 is secured to the member 84 which supports the record trough 46.

Since the member 57 is not actuated by the ten-inch phonograph record, the cam shaft 74 drives the cam 82 against the cam follower 83 shown in Figure 12. This moves the record trough 46 upwardly to a greater extent than was the case with the twelve-inch record.

Since the member 53 has not been actuated the twelve-inch limit 88 remains in a position where it will not be engaged by the outer extremity of the arm 89. The manner in which the phonograph record is engaged and driven is the same as in the case of the twelve-inch record. The cam 94 in engaging the spring 98, however, moves the arm 89 downwardly to a greater extent until it engages the ten-inch index arm 87. This brings the extremities of the pickup arm assembly 47 in a greater distance so that the styli are located in the proximity of the starting groove of a ten-inch record. The tilting of the assembly 47 and the manner of operation is the same as in the twelve-inch record. After one side of the record has been reproduced, the other side of the record is also reproduced if the slide button 35 is in the position originally assumed in the foregoing description of the operation for twelve-inch phonograph records.

*Playing one side of the record only*

If it is desired to preset the operation of the phonograph for the playing of only one side of each of the records stored in the record magazine 38, this may be accomplished by actuation of the push button 35 to the position shown in Figures 1, 2, and 3. In this position the push button 35 has moved its downwardly extending portion 111 so as to move the interconnecting link 109 against one end of a bell crank 107. The bell crank 107 which is pivotally mounted at 108 has a curved outer extremity 105 which is moved into a position for subsequent engagement with the cam surface 104. The bell crank 107 at an intermediate point carries a resilient finger 112 which is moved into engagement with the pivoted cam 113.

Assuming that a phonograph record has been supplied to the driving mechanism, the cam 94 moves on to engage the pivoted cam 113 thus moving the slide 168 toward the right as indicated by Figures 16 and 17. This causes the pickup of the assembly 47 to reproduce one side of the phonograph record as indicated in Figure 14. After the record has been reproduced on that side, the switch 195 is actuated to cause further movement of the cam shaft 74. At this time, however, the cam 94 clears the cam 113 and the cam surface 104 engages the outer extremity 105 of the bell crank 107 which deflects this cam in the manner illustrated in Figure 11. The cam thus being deflected fails to engage the outer extremity of the arm 89 and also fails to engage the pivoted cam surface 113. The result is that the bell crank lever 171 is not again actuated so as to engage the switch 174. The sequence operation motor 77 therefore continues to rotate until the cam surface 95 engages the outer extremity of the arm 89 to move the tone arms 47 away from the phonograph record. When this occurs the cam shaft has rotated sufficiently to bring into engagement the cam 78 with the rod 42 so as to strip the phonograph record from the pin 144 and to cause it to drop into the return track 49. This sequence of operations is brought about for each record so that only one side of each record is played.

*Playing of individual records*

The phonograph may be operated so as to play individual records which has commonly been called by the trade "manual operation of the automatic phonograph." A single record may be placed in the record magazine 38 for playing either one side or both sides of the record dependent upon the predetermination of the operation as controlled by the setting of the slide knob 35. If only one side of the record is to be played, the control knob 35 is moved to the position shown in Figures 2 and 3. If it is desired to play both sides of the record the control knob 35 is moved to the other end of the slot 36 in the escutcheon 37. Having determined whether one side or both sides of the record are to be played, the push button 34 is actuated. Where the phonograph record is placed in the trough or magazine 38, the record trough switch 201 is closed by the weight of the record so that actuation of the push button to close the switch 188 will bring about one cycle of operation of the mechanism of the phonograph. The record will be lifted by the mechanism 55 into the trough 56 from which it will pass on to the trough elevator 46 for subsequent positioning on the phonograph record rotating mechanism and reproduction by the tone arm. The operation of the mechanism in this respect is the same as the operation previously described for a series of records in the automatic operation of the phonograph.

If desired individual records may be played by placing the record directly into the trough 56 so that the record moves on down to the record elevator 46. When the record is in the elevator 46, the push button 34 may be actuated. The push button 34 as may be seen from the circuit diagram of Figure 20 closes two single throw normally open contact switches 188 and 190. The switch 188 by itself is effective to initiate a cycle of operation of the phonograph when the switch 201 is closed by a record in the record magazine. Where the record, however, is individually placed in the trough 56 so as to move on down to the elevator 46, the switch 190 is closed by the push button 34. The switch 190 is in parallel with the switches 201 and 199. The closing of the switch 190 initiates operation of the phonograph so that the cam actuated switch 199 is subsequently closed to permit elevation of the record in the record trough 46, and reproduction of the record.

While for the purpose of showing and describing the present invention, the drawings have shown a particular embodiment, it is to be understood that such variations in the arrangement and in the instrumentalities employed are contemplated as may be commensurate with the spirit and scope of the invention set forth in the following claims.

This invention is hereby claimed as follows:

1. An automatic phonograph for playing phonograph records comprising a record magazine, a record reject magazine, a record support and drive mechanism for vertically rotating a record in either of two directions, a dual phonograph pickup arm adapted to reproduce said record, a record transfer mechanism for supplying a record from said first magazine to said record support and driving mechanism, said mechanism including an apparatus vertically reciprocable for elevating said record to the proper height for rotation by said record support and driving mechanism, index means adjacent said elevating apparatus responsive to a predetermined diameter record for controlling the travel of said record elevating apparatus and for predetermining the starting position of said pickup arm, a sequence operation mechanism for actuating said elevating apparatus, means for securing said record on said record support and drive mechanism and for positioning said phonograph pickup arm, means responsive to the positioning of said pickup arm at the beginning of a record for stopping said sequence operation mechanism, means responsive to the completion of the playing of one side of a record for re-starting said sequence operation mechanism, and a second record transfer mechanism for moving a reproduced record to said record reject magazine.

2. An automatic phonograph for playing intermixed records of different diameters and different thicknesses comprising a record magazine, a record reject magazine, a record support and drive mechanism for vertically rotating a record in either of two directions, a dual pickup arm adapted to reproduce said record, means for supplying a record from said first magazine to said record support and drive mechanism, means vertically reciprocable for elevating said record to proper height for rotation by said drive mechanism, index means adjacent said elevating means responsive to a predetermined diameter record for controlling the travel of said record elevating means and for predetermining the starting position of said pickup arm, means for predetermining the operation of said phonograph to play one side of each record or both sides of each record in sequence, starting means for initiating operation of said phonograph and for predetermining the initial playing of a certain side of said record, a sequence operation mechanism for actuating said elevating means, for securing said record on said record support and drive mechanism and for positioning said pickup arm, means normally responsive to the completion of the playing of one side of a record for shifting the pickup arm to the other side of the record and for reversing the direction of rotation of the record, means responsive to the positioning of said pickup arm at the beginning of a record for stopping the sequence operation mechanism, means responsive to the completion of the playing of the record for starting said sequence operation mechanism, means responsive to the completion of the reproduction of a record as predetermined for moving the reproduced record to the record reject magazine, and means responsive to the removal of the last record from said record magazine for controlling the stopping of said sequence operation mechanism after the reproduction of the last phonograph record.

3. An automatic phonograph comprising a record magazine for receiving a plurality of records in a substantially vertical position, said record magazine having adjacent the forward side a plurality of retaining members, spring biased means cooperating with said record magazine for urging records therein toward said retaining members, means for vertically rotating and reproducing a phonograph record, record transferring means interconnecting said reproducing means with said record magazine for moving records in a vertical plane therebetween, articulated reciprocable means located at one side and to the exterior of said magazine for supplying thereto records one at a time from said record magazine including means for elevating an individual record sufficiently so as to clear at least one of said record retaining members and means for elevating a record from said transferring means to said record rotating and reproducing means.

4. An automatic phonograph comprising a record magazine for receiving a plurality of records in a substantially vertical position, the record magazine being arranged to support the records at spaced apart circumferential points, the record magazine being provided adjacent one side with record retaining means, spring biased means for urging the records in said magazine toward said record retaining means, means for vertically rotating and reproducing a record, conveying means interconnecting said rotating and record reproducing means with said magazine, means for supplying from said magazine one record at a time to said conveying means including a reciprocable member for engaging one side and one edge of a phonograph record to raise said record in said magazine sufficiently to clear said record retaining means, and means for moving said supply means linearly during forward motion and through an angle during rearward motion.

5. The combination in an automatic phonograph comprising a record magazine for receiving a plurality of records, said magazine being provided adjacent one side with record retaining means, spring biased means for urging records in said magazine at a slight angle to the vertical toward said record retaining means, means for vertically rotating and reproducing the phonograph record, record conveying means interconnecting said rotating means with said magazine, and means located adjacent the outside of said magazine for withdrawing a single record from said magazine irrespective of differences in the thickness of the record and for supplying said record to said conveying means including a reciprocable member having a member arranged to engage the edge portion of a record which extends beyond the record magazine, said reciprocable member having a one-way cam surface for moving said member through an angle, and a fixed cam actuator for engaging said cam surface.

6. An automatic phonograph including means for vertically rotating and reproducing a phonograph record comprising a record driving disk mounted on the end of a shaft, said shaft and disk having an aperture therein, a record engaging arm carrying a disk and a pin at the center thereof for engaging the hole in a record, said disk and pin being rotatably mounted in a bearing, and a resilient support sleeve interconnecting said bearing with said record engaging arm to permit the axis of said pin to be aligned with the axis of said driving disk and shaft.

7. In an automatic phonograph for reproducing records in a vertical position, the combination comprising means for rotating a phonograph record including a record driving disk mounted on the end of a shaft, said shaft having an aperture therein, a pivoted record engaging arm, said arm having adjacent its free end a disk for engaging the face of a record and a pin for engaging the hole in a record, said disk and pin being rotatably mounted in a bearing, a flexible resilient support sleeve interconnecting said bearing with said pivoted arm to permit the axes of said pin and bearing to be aligned with the axis of said record driving shaft, and means positioned below said flexible resilient support for limiting the displacement of said disk and pin.

8. In an automatic phonograph for reproducing records of different thicknesses, the combination comprising means for rotating a phonograph record in a vertical plane including a record driving shaft having at the end thereof a record engaging disk, said shaft and disk having an aperture therein, a pivoted record engaging arm having at the free end thereof a disk for engaging the surface of a phonograph record and a centrally positioned pin for engaging the hole in a record and the aperture in said shaft, a bearing for said pin and disk, a resilient flexible support sleeve interconnecting said bearing with said pivoted arm, and means for biasing said arm toward said record driving shaft and disk to hold the phonograph record in driving relation thereto irrespective of the thickness of the record.

FRANK FREIMANN.
CARL HART.
ARTHUR L. KNOX, Sr.

REFERENCES CITED

The following references are of record in the file of this patent:

UNITED STATES PATENTS

| Number | Name | Date |
|---|---|---|
| 1,377,027 | Pettit | May 3, 1921 |
| 1,868,846 | Oyston | July 26, 1932 |
| 1,883,238 | La Rue et al. | Oct. 18, 1932 |
| 2,007,054 | Jones et al. | July 2, 1935 |
| 2,323,365 | Andrews | July 6, 1943 |
| 2,340,418 | Gabel | Feb. 1, 1944 |
| 2,348,766 | Wagner et al. | May 16, 1944 |
| 2,406,355 | Darwin et al. | Aug. 27, 1946 |
| 2,458,496 | Andrews | Jan. 11, 1949 |

FOREIGN PATENTS

| Number | Country | Date |
|---|---|---|
| 490,551 | Great Britain | Aug. 16, 1938 |